United States Patent [19]
Van Ochten et al.

[11] Patent Number: 5,815,255
[45] Date of Patent: Sep. 29, 1998

[54] METHOD AND SYSTEM FOR MEASURING DEFLECTION ANGLE OF A BEAM OF LIGHT REFLECTED FROM A DISK TO DETERMINE TILT OF THE DISK

[75] Inventors: Mitchell G. Van Ochten, Livonia; Matthew P. Frazer, Plymouth; Yongxing Wang, Novi, all of Mich.

[73] Assignee: Medar, Inc., Farmington Hills, Mich.

[21] Appl. No.: 801,903

[22] Filed: Feb. 14, 1997

[51] Int. Cl.$^6$ .................................................. G01B 11/26
[52] U.S. Cl. .......................... 356/138; 356/394; 356/371
[58] Field of Search .................................. 356/394, 371, 356/430, 136, 373, 375, 376, 140, 398, 139.03, 141–141.5, 150, 152.1–152.3, 153, 154; 250/559.45, 208.6, 559.39, 559.2, 559.27; 369/44.32

[56] References Cited

U.S. PATENT DOCUMENTS

| | | | |
|---|---|---|---|
| 4,297,034 | 10/1981 | Ito et al. | 356/394 |
| 5,646,415 | 7/1997 | Yanagisawa | 356/430 X |

Primary Examiner—K. Hantis
Attorney, Agent, or Firm—Brooks & Kushman P.C.

[57] ABSTRACT

A method and system are provided for measuring a two-dimensional deflection angle of a beam of light reflected from a disk having unknown radial and tangential tilt components by first generating reference data relating to known tilt of a reference disk and then processing the reference data with electrical signals from a two-dimensional photodetector to obtain values related to the deflection angle and the unknown radial and tangential tilt components. The photodetector is preferably a semiconductor photodiode having an active area which measures position of radiant energy in a spot of light focused in a detector plane by a focusing lens. A signal processor including a computer system programmed in accordance with a software algorithm compensates for interaction between X and Y axes of the active area of the photodiode to compensate for alignment errors or tolerances, not only up, down, left and right, but also for rotational errors as well. In this way, the method and system can utilize a single small, relatively low cost semiconductor photodiode for both radial and tangential measurements of the same spot of light.

25 Claims, 3 Drawing Sheets

METHOD AND SYSTEM FOR MEASURING DEFLECTION ANGLE OF A BEAM OF LIGHT REFLECTED FROM A DISK TO DETERMINE TILT OF THE DISK

TECHNICAL FIELD

This invention relates to methods and systems for measuring deflection angle of a beam of light reflected from a disk and, in particular, to methods and systems for measuring deflection angle of a beam of light reflected from a disk to determine tilt of the disk.

BACKGROUND ART

Numerous prior art methods and systems are available for measuring deflection angle of a beam of light reflected from an object. Such prior art methods include visual observation of the lateral position of a reflected light beam and automatic linear displacement sensors for recording information that can be used to deduce beam deflection angle. The first method is slow and is not suitable for use on-line at disk production speeds. The second method is an indirect method that does not necessarily provide the desired required information and is less relevant in practical terms to the functioning of a disk reader.

The basic principle that angular displacement of a collimated light beam is transformed into linear displacement by a lens is well known and is used as the principle behind all autocollimators. FIG. 1 illustrates a first set of incoming light beams 10 that are focused by a lens 12 to a spot 20 on a detector plane 16. When a second set of incoming light beams 18 have an angle A with respect to the first set of light beams 10, the lens 12 focuses the light beams 18 to a spot 14 in the detector plane 16 displaced from the spot 14 by a distance d. For a perfect lens, d=f, (the focal length of the lens 12) times the tangent of the angle A. A suitable photodetector placed at the back focus of the lens 12 in the plane 16 will produce an electrical signal that is proportional to the linear displacement d of the light spot.

FIG. 2 illustrates one system for automatically measuring the deflection angle of a beam of light reflected from an object such as optical disk 22. FIG. 3 illustrates a second system for automatically measuring the deflection angle of a beam of light reflected from the same optical disk 22.

The systems of FIGS. 2 and 3 both provide a means for checking the quality such as flatness of optical disks which in itself is a functional quality parameter. The beam deflection angle (due to disk tilt or warp as well as refraction effects of the clearer substrate) has a direct effect on the playability of such optical disks.

Referring specifically now to FIG. 2, there is illustrated a collimated light beam generated by a solid state laser or gas laser 24. The beam is directed by a beam splitter 26 to the optical disk 22 as it rotates on a spindle (not shown). The beam reflects and is passed through the beam splitter 26, through a focusing lens 28 to a detector plane 30 in which a photodetector may be placed. The rotating disk 22 thereby produces varying beam deflection angles (due to disk warpage as well as refraction via the disk substrate) as the focused light spot moves over the photodetector in the detector plane 30. Such a photodetector produces varying electrical output signals. The relationship between beam deflection angle and detector output signals can be calibrated for direct reading of the deflection angle.

Referring specifically now to FIG. 3, an alternative system is illustrated which uses autocollimation of a small light source 32 which provides a beam of light through an apertured mask 34. A focusing lens 36 not only reimages the reflected light onto a detector positioned in a detector plane 38, but also serves to collimate the light after reflection by a beam splitter 40 toward the disk 22.

Both systems of FIGS. 2 and 3 provide automatic measurement of light beam deflection angle from an optical data disk 22.

The detector, which can be placed in the detector plane 30 or 38 of FIGS. 2 and 3, respectively, may be a discrete multi-cell photodiode which allows the conversion of light spot position to a proportional electrical signal. Use of a bi-cell allows measurement of angles in one dimension only, however. Additional cells such as provided by a quad-cell allows two-dimensional angular measurement.

Another detector which can be placed in the detector plane 30 or 38 is a lateral effect photodiode position sensing detector or device (PSD) which is continuous and allows for even greater accuracy than the multi-cell detectors. Such detectors are available in one or two-dimensional versions.

Preferably, it is desirable to use a position sensing detector which is small and which is relatively low cost such as a silicon photodiode 42 as illustrated in FIGS. 4 and 5 in its top plan and side elevational views, respectively. Such photodiodes are available from On-Trak Photonics, Inc. of Lake Forest, Calif. and have the designation of 2L2SP or 2L4SP to indicate that the photodiode is a duo-lateral, two-dimensional, position sensing detector.

One problem with the use of such a small relatively low cost position sensing detector as illustrated in FIGS. 4 and 5 is that slight alignment errors in the photodiode 42 and/or its active area 44 causes undesirable interaction between the X and Y axes of the active area 44. For example, the detector active area 44 which comprises a thin, rectangular slice of silicon may have a two percent rotational error with respect to the rest of the photodiode 42 which results in an unacceptable amount of error in determining deflection angle and thereby tilt.

SUMMARY OF THE INVENTION

An object of the present invention is to provide a method and system for measuring a deflection angle of a beam of light reflected from a disk to detect tilt of the disk wherein alignment errors are corrected by processing reference data related to known tilt of a reference disk with at least one electrical signal generated by a photodetector positioned in a detector plane to detect a focused spot of the reflected beam.

In carrying out the above object and other objects of the present invention, a method is provided for measuring deflection angle of a beam of light reflected from a disk to determine tilt of the disk. The method includes the steps of generating reference data related to a known tilt of a reference disk and directing a beam of controlled light at a surface of the disk having an unknown tilt to generate a corresponding reflected light signal having an angular displacement based on the unknown tilt. The method also includes the step of receiving the reflected light signal with an optical component for creating a relatively small focused spot of light from the reflected light signal in a detector plane wherein the optical component transfers the angular displacement of the reflected light signal into a linear displacement of the focused spot of light in the detector plane. The method also includes the step of measuring position of radiant energy in the focused spot of light in the detector plane and producing at least one electrical signal proportional to the linear displacement. Finally, the method includes the step of processing the at least one electrical signal with the reference data to obtain at least one value related to the deflection angle and the unknown tilt of the disk.

Still further in carrying out the above object and other objects of the present invention, a system is provided for measuring deflection of a beam of light reflected from a disk to determine tilt of the disk. The system includes means for generating reference data related to known tilt of a reference disk. The system also includes means for directing a beam of controlled light at a surface of the disk having an unknown tilt to generate a corresponding reflected light signal having an angular displacement based on the unknown tilt. The system further includes an optical component to create a relatively small focused spot of light from the reflected light signal in a detector plane wherein the optical component transforms the angular displacement of the reflected light signal into a linear displacement of the focused spot of light in the detector plane. The system also includes a photodetector for measuring position of radiant energy in the spot of light in the detector plane and producing at least one electrical signal proportional to the linear displacement of the spot of light in the detector plane. Finally, the system includes a signal processor including a programmed computer system to process the at least one electrical signal with the reference data to obtain at least one value related to the deflection angle and the unknown tilt of the disk.

Preferably, the deflection angle is two-dimensional and each of the known and unknown tilts have radial and tangential tilt components and wherein a pair of electrical signals are produced and processed with the reference data to obtain a pair of values related to the two-dimensional deflection angle and the known and unknown radial and tangential tilt components.

The advantages accruing to the method and system of the present invention are numerous. For example, the invention permits construction of the system with minimal alignment effort after assembly. Also, the method and system permit the use of small, relatively low cost, position sensing detectors.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 6:
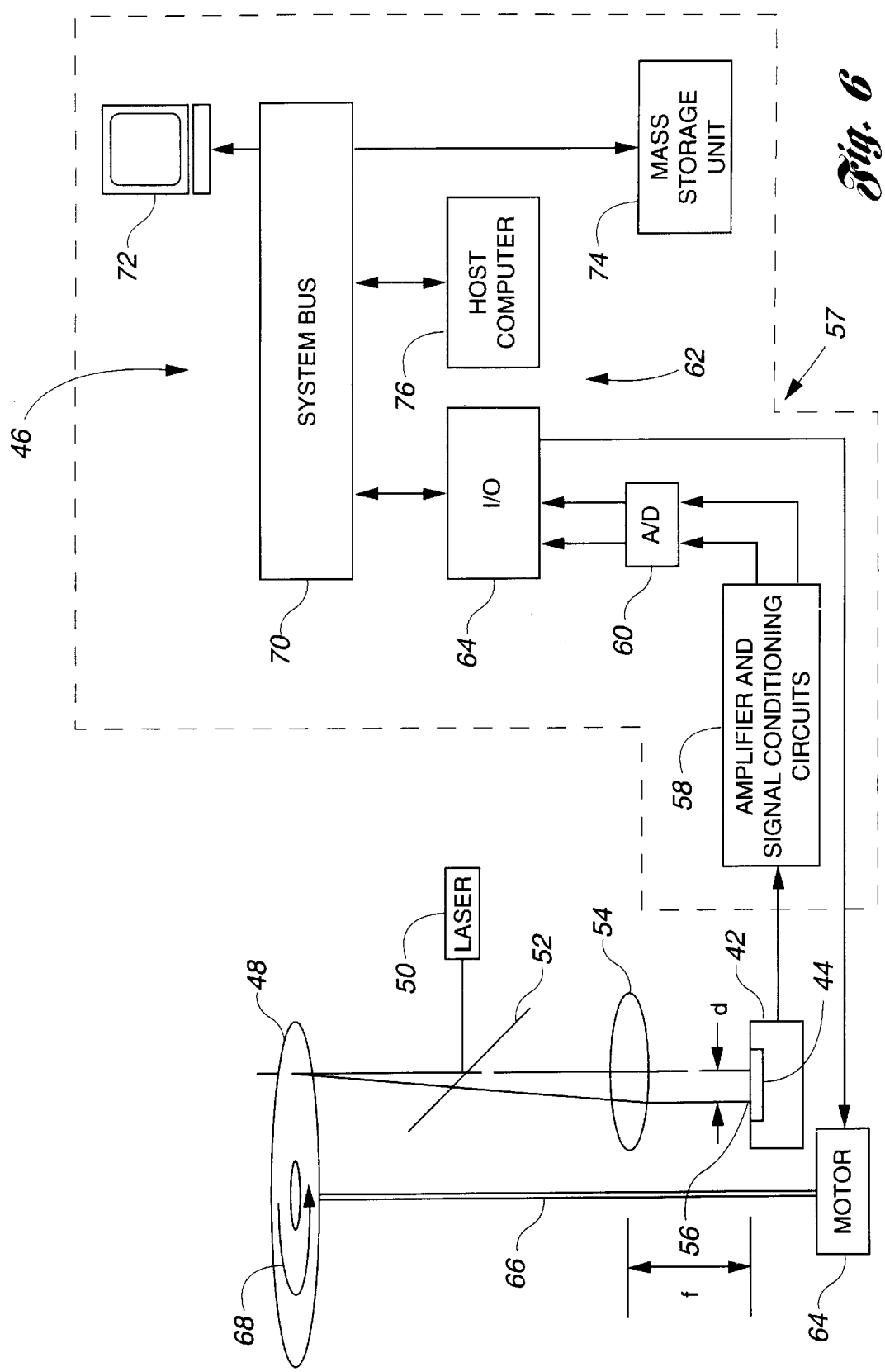
FIG. 6 is a schematic diagram illustrating the method and system of the present invention.

Referring again to the drawing Figures, there is illustrated in FIG. 6, a system, generally indicated at 46, for measuring deflection angle of a beam of light reflected from a disk such as an optical disk 48 to determine tilt or warpage of the disk 48. While the method and system of the present invention can be utilized to determine tilt of the disk 48 in a single dimension, preferably the method and system of the present invention are utilized to measure both radial and tangential tilt components of the disk 48.

The disk 48 may be an optical media substrate such as an optical or MO disk. The method and system of the present invention are not limited to optical or compact disks which typically include DVD's, audio CD's, CD-R and CD-ROM devices.

Figure 4:
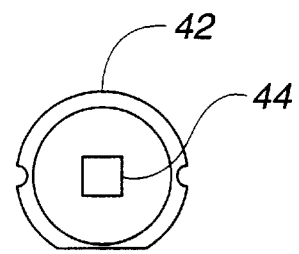
FIG. 4 is a top plan schematic view of a preferred position sensing detector for use in the method and system of the present invention.
Figure 5:
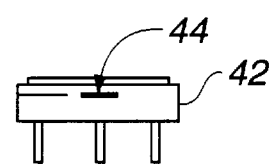
FIG. 5 is a side elevational view of the position sensing detector of FIG. 4.

The system preferably includes a laser such as a visible, solid state laser diode 50 to illuminate the lower surface of the optical compact disk 48 through the use of a beam splitter 52. Reflections from the lower surface of the optical disk 48 are recovered through the beam splitter 52 and focused by an optical component such as a focusing lens 54 onto a two-dimensional position sensing detector which is preferably the silicon photodiode 42 specifically illustrated in FIGS. 4 and 5. The photodiode 42 provides analog output signals directly proportional to the position of a light spot 56 on the active area 44. The detector 42 (along with the amplifier and signal conditioning circuits 58 noted below) allows one to monitor two-dimensional position independent of fluctuations in intensity of the light spot 56.

The analog electrical output signals from the detector 42 are processed by a signal processor, generally indicated at 57. The signal processor 57 includes amplifier and signal conditioning circuits 58 which amplify and condition the signals and separates the signals into X and Y components for input into an analog-to-digital converter circuit 60 of the processor 57. The X and Y components are digitized and the resulting digital signals are input into a host computer system, generally indicated at 62 of the processor 57, which system 62 processes the digital signals to ultimately yield values related to the absolute two-dimensional position of the spot 56 on the active area 44 which, in turn, is related to warpage (i.e., tilt) of the optical disk 48.

The computer system 62 includes input/output circuits 64 to allow the system 62 to communicate with the A/D converter circuits 60, as well as with an electrical motor 64, which includes a shaft 66 for rotating the optical disk 48 in the direction of an arrow 68 upon energization of the motor 64.

Typically, the rotating optical disk 48 produces a varying beam deflection angle to cause the light spot 56 to move over the active area 44 of the detector 42, thereby producing varying electrical signals which are subsequently processed by the signal processor 57.

The computer system 62 also includes a system bus 70 which may be either a PCI, an EISA, ISA, or VME system bus or any other standard bus to allow inter-system communication such as with a monitor 72 of the computer system 62.

The computer system 62 may be programmed at a mass storage unit 74 to include a computer program useful in the generation of reference or calibration data, where the system 20 measures the deflection angle of a beam of light reflected from a reference disk having a known tilt.

The computer system 62 also includes a host computer 76 which may be a PC having a sufficient amount of RAM and hard disk space for computer programs for controlling the computer system 62.

Figure 1:
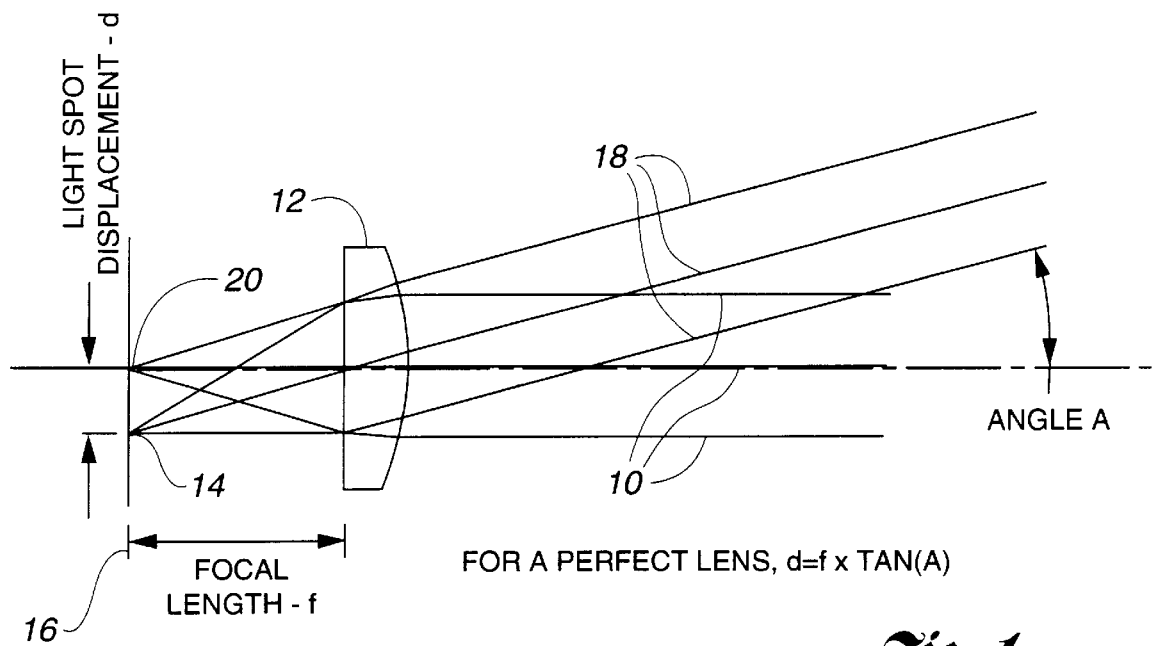
FIG. 1 is a schematic diagram illustrating the basic principle that angular displacement of a reflected, collimated light beam is transformed into linear displacement in a detector plane by a focusing lens.
Figure 2:
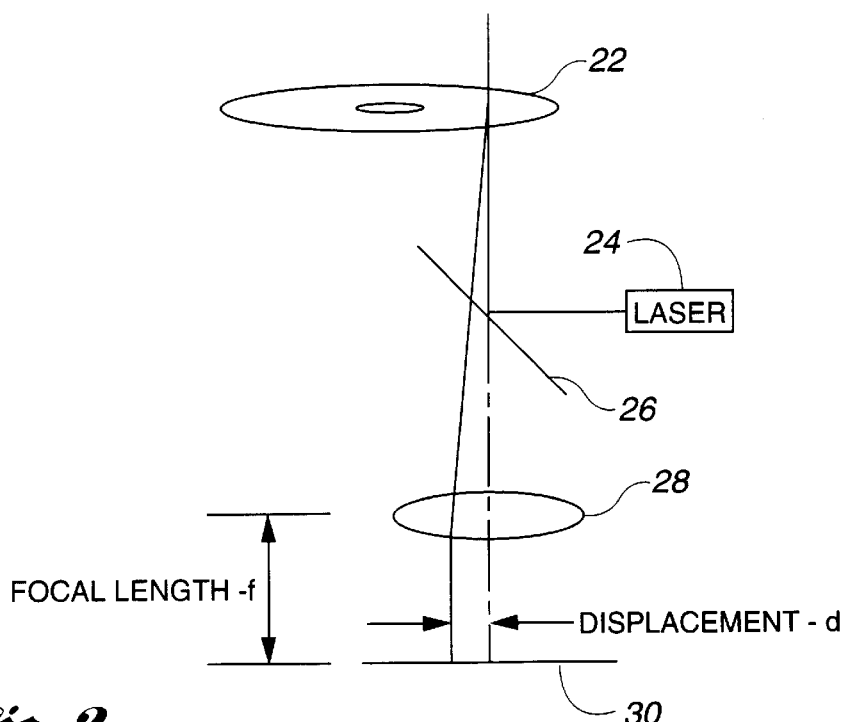
FIG. 2 is a schematic diagram of a first prior art system for automatically measuring light beam deflection angle from an optical data disk.
Figure 3:
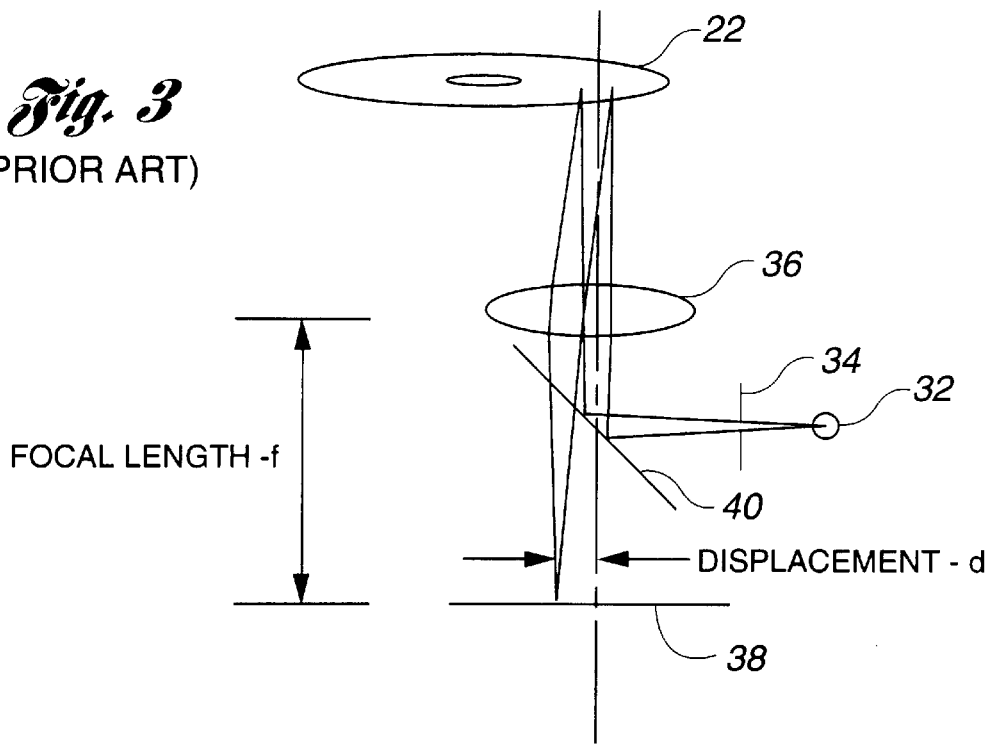
FIG. 3 is similar to FIG. 2 and illustrates a second prior art system for automatically measuring light beam deflection angle from an optical data disk.

As previously mentioned, one difficulty with the system of FIGS. 2 and 3 is the interaction between the X and Y axes of the active area 44 due to slight alignment errors in positioning the position sensing detector 42 and/or the active area 44 within the detector 42. A software algorithm, the derivation of which is described in detail hereinbelow, effectively compensates for the misalignment by virtue of an initial calibration of the system of FIG. 6 using a disk such as a reference disk having known radial and tangential tilt components.

The software algorithm enables the use of a single, two-dimensional, position sensitive photodiode such as the detector 42 for both radial and tangential tilt measurements. It permits construction of the system of FIG. 6 with minimal alignment effort after assembly due to the system's ability to correct for alignment tolerances, not only up, down, left and right, but also for rotational errors of the active area 44 relative to the rest of the detector 42.

The ability to correct for alignment tolerances in software contained within the computer system 62 permits the use of the small, relatively low cost, position sensing detector 42. The use of a single detector for both radial and tangential measurements from the same spot of light allows greater confidence if the measured data corresponds with the actual disk under test.

Figure 7:
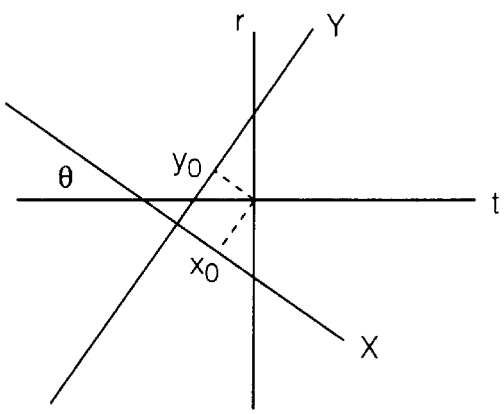
FIG. 7 is a view of two coordinate systems superimposed upon one another, one of which illustrates radial and tangential tilt components angularly displaced from the other X, Y components.

What now follows is a mathematical derivation of the software algorithm of the method and system of the present invention taken with reference to the coordinate systems of FIG. 7.

RELATIONSHIP BETWEEN PSD POSITION
AND TILT ANGLE $$\begin{bmatrix} \alpha_t \\ \alpha_r \\ 1 \end{bmatrix} = \begin{bmatrix} C_x & 0 & 0 \\ 0 & C_y & 0 \\ 0 & 0 & 1 \end{bmatrix} \cdot$$

$$\begin{bmatrix} \cos(\theta) & \sin(\theta) & 0 \\ -\sin(\theta) & \cos(\theta) & 0 \\ 0 & 0 & 1 \end{bmatrix} \cdot \begin{bmatrix} 1 & 0 & -x_0 \\ 0 & 1 & -y_0 \\ 0 & 0 & 1 \end{bmatrix} \cdot \begin{bmatrix} x \\ y \\ 1 \end{bmatrix}$$

where:
- $\alpha_t$ is tangential tilt angle;
- $\alpha_r$ is radial tilt angle;
- x is x coordinate of the laser point in PSD coordinate system;
- y is y coordinate of the laser point in PSD coordinate system;
- $x_o$ is x coordinate of the laser point in PSD coordinate system when there is no tilt;
- $y_0$ is y coordinate of the laser point in PSD coordinate system when there is no tilt;
- $\theta$ is rotation angle of PSD coordinate system with respect to the ideal coordinate system;
- $C_x$ is scaling factor between x coordinate of the PSD and the tangential tilt angle; and
- $C_y$ is scaling factor between y coordinate of the PSD and the radial tilt angle.

RELATIONSHIP BETWEEN PSD VOLTAGE
OUTPUT AND TILT ANGLE

PSD Equation $$\begin{bmatrix} x \\ y \\ 1 \end{bmatrix} = \begin{bmatrix} S_x & 0 & 0 \\ 0 & S_y & 0 \\ 0 & 0 & 1 \end{bmatrix} \cdot \begin{bmatrix} v_x \\ v_y \\ 1 \end{bmatrix}$$

where:
- $v_x$ is PSD x direction voltage output;
- $v_y$ is PSD y direction voltage output;
- $S_x$ is scaling factor between PSD x direction voltage output and x coordinate of the laser point; and
- $S_y$ is scaling factor between PSD y direction voltage output and y coordinate of the laser point.

Tilt System Transform $$\begin{bmatrix} \alpha_t \\ \alpha_r \\ 1 \end{bmatrix} = \begin{bmatrix} C_x & 0 & 0 \\ 0 & C_y & 0 \\ 0 & 0 & 1 \end{bmatrix} \cdot \begin{bmatrix} \cos(\theta) & \sin(\theta) & 0 \\ -\sin(\theta) & \cos(\theta) & 0 \\ 0 & 0 & 1 \end{bmatrix} \cdot$$

$$\begin{bmatrix} S_x & 0 & 0 \\ 0 & S_y & 0 \\ 0 & 0 & 1 \end{bmatrix} \cdot \begin{bmatrix} 1 & 0 & -v_{x0} \\ 0 & 1 & -v_{y0} \\ 0 & 0 & 1 \end{bmatrix} \cdot \begin{bmatrix} V_x \\ V_y \\ 1 \end{bmatrix}$$

where:
- $v_{x0}$ is PSD x direction voltage output when there is no tilt; and
- $v_{y0}$ is PSD y direction voltage output when there is no tilt.

Tilt Model $\alpha_t = C_x S_x \cos(\theta) V_x + C_x S_y \sin(\theta) v_y - C_x S_x \cos(\theta) v_{x0} - C_x S_y \sin(\theta) V_{y0}$ $\alpha_r = -C_y S_x \sin(\theta) V_x + C_y S_y \cos(\theta) v_y + C_y S_x \sin(\theta) v_{x0} - C_y S_y \cos(\theta) V_{y0}$ There are seven unknowns in above expressions:

$C_x$, $C_y$, $S_x$, $S_y$, $\theta$, $V_{x0}$, $V_{y0}$

So, at least four pairs of $\alpha_t$ and $\alpha_r$ are needed.

SIMPLIFIED TILT MODEL

Assume $S_x = S_y$

This assumption says the PSD has the same characteristics in its x and y axis. Under this condition, the tilt model becomes the following:

$\alpha_t = C_x \cos(\theta) v_x + C_x \sin(\theta) v_y - C_x \cos(\theta) v_{x0} - C_x \sin(\theta) v_{y0}$ $\alpha_r = C_y \sin(\theta) v_x + C_y \cos(\theta) v_y + C_y \sin(\theta) v_{x0} - C_y \cos(\theta) v_{y0}$ Note that S $C_i = C_i$.

Now that we have five unknowns: $C_x$, $C_y$, $\theta$, $V_{x0}$, $V_{y0}$, we need at least three pairs of $\alpha_t$, and $\alpha_r$, data.

Assume $C_x = C_y S_x = S_y$ $\alpha_t S(\cos(\theta) v_x + \sin(\theta) v_y - \cos(\theta) v_{x0} - \sin(\theta) v_{y0})$ $\alpha_r = S(-\sin(\theta) v_x + \cos(\theta) v_y + \sin(\theta) v_{x0} - \cos(\theta) v_{y0})$ Only has four unknowns: S, $\theta$, $V_{x0}$, $V_{y0}$, thus at least two pairs of $\alpha_t$ and $\alpha_r$ are needed.

TILT CALIBRATION

Linear Tilt Model

All the tilt models above have non-linear dependency on the unknown parameters. We can linearize the equations so the linear least square fit becomes possible.

$$\alpha_t = t_1 v_x + t_2 v_y + t_3$$

$$\alpha_r = r_1 v_x + r_2 v_y + r_3$$

In a more compact form:

$$\alpha_i = \sum_{j=1}^{3} p_{ij} v_j$$

where, $P_{1j}=t_j$, $P_{2j}=r_j$, $v_1=v_x$, $v_2=v_y$, $v_3=1$ i=t, r

LINEAR LEAST SQUARE FIT

Generic Parameter Fitting For Tilt $$[A][P]=[B]$$

$$A_{ij} = \sum_{k=1}^{m} (v_i)_k (v_j)_k$$

$$B_{in} = \sum_{k=1}^{m} (v_i)_k (\alpha_n)_k$$

$$P_{in} = p_{in}$$

where, i,j=1,2,3 n=1, 2

At least three pairs of $\alpha_t$ and $\alpha_r$ data to fit unknowns ($p_{i1}$'s) are needed.

Parameter Fitting for Simplified Tilt Model

Matrix Representation

Let's consider model where $C_x=C_y$, $S_x=S_y$ with only four known parameters. The linear tilt model can be expressed as:

$$\alpha_t = t_1 v_x + t_2 v_y + t_3$$

$$\alpha_r = t_2 v_x + t_1 v_y + t_4$$

$$\begin{bmatrix} v_x & v_y & 1 & 0 \\ v_y & -v_x & 0 & 1 \end{bmatrix} \begin{bmatrix} t_1 \\ t_2 \\ t_3 \\ t_4 \end{bmatrix} = \begin{bmatrix} \alpha_t \\ \alpha_r \end{bmatrix} \rightarrow [V][P]=[\alpha]$$

Modified Least Square Method

Parameters can be fit using a modified least square method that minimizes the total square errors of $\alpha_t$ and $\alpha_r$.

$$[A][P]=[B]$$

$$A_{ij} = \sum_{n=1}^{2} \sum_{k=1}^{m} (v_{ni})_k (v_{nj})_k$$

$$B_i = \sum_{n=1}^{2} \sum_{k=1}^{m} (v_{ni})_k (\alpha_n)_k$$

$$P_i = t_i$$

where, i, j=1,2,3,4

Solve For The Unknown Parameters $$\theta = \tan^{-1}\left(\frac{t_2}{t_1}\right)$$

$$S = \sqrt{t_1^2 + t_2^2}$$

$$V_{x0} = \frac{t_4 \sin(\theta) - t_3 \cos(\theta)}{S}$$

$$V_{y0} = \frac{t_4 \cos(\theta) + t_3 \sin(\theta)}{S}$$

Parameter Fitting For The First Simplified Tilt Model ($S_x=S_y$ only)

A similar approach is used to do parameter fitting except in this case, there are five unknowns.

While the best mode for carrying out the invention has been described in detail, those familiar with the art to which this invention relates will recognize various alternative designs and embodiments for practicing the invention as defined by the following claims.

What is claimed is:

1. A method for measuring deflection angle of a beam of controlled light reflected from a disk to determine tilt of the disk, the method comprising the steps of:

generating reference data related to known radial and tangential tilt components of a reference disk;

directing the beam of controlled light at a surface of the disk having unknown radial and tangential tilt components to generate a corresponding reflected light signal having an angular displacement based on the unknown radial and tangential tilt components;

receiving the reflected light signal with an optical component for creating a relatively small focused spot of light from the reflected light signal in a detector plane wherein the optical component transforms the angular displacement of the reflected light signal into a linear displacement of the focused spot of light in the detector plane;

measuring position of radiant energy in the focused spot of light in the detector plane and producing a pair of electrical signals proportional to the linear displacement; and processing the pair of electrical signal with the reference data to obtain a pair of values related to the deflection angle whereby the unknown radial and tangential tilt components of the disk are determined.

2. The method as claimed in claim 1 wherein the step of measuring is accomplished with a two-dimensional position sensing detector positioned in the detector plane.

3. The method as claimed in claim 2 wherein the two-dimensional position sensing detector is a photodiode.

4. The method as claimed in claim 1 wherein the beam of controlled light is a collimated light beam.

5. The method as claimed in claim 4 wherein the collimated light beam is a laser beam.

6. The method as claimed in claim 1 wherein the step of measuring is accomplished with a position sensing detector positioned in the detector plane.

7. The method as claimed in claim 6 wherein the position sensing detector is a single photodetector.

8. The method as claimed in claim 6 wherein the position sensing detector is a semiconductor device.

9. The method as claimed in claim 8 wherein the semiconductor device is a photodiode.

10. The method as claimed in claim 1 wherein the optical component is a focusing lens.

11. The method as claimed in claim 1 wherein the disk is a compact disk.

12. The method as claimed in claim 1 wherein the disk is an optical disk.

13. The method as claimed in claim 1 wherein the step of generating includes performing the steps of directing, receiving, and measuring with the reference disk.

14. A system for measuring deflection angle of a beam of controlled light reflected from a disk to determine tilt of the disk, the system comprising:

means for generating reference data related to known radial and tangential tilt components of a reference disk;

means for directing the beam of controlled light at a surface of the disk having unknown radial and tangential tilt components to generate a corresponding reflected light signal having an angular displacement based on the unknown radial and tangential tilt components;

an optical component for receiving the reflected light signal to create a relatively small focused spot of light from the reflected light signal in a detector plane wherein the optical component transforms the angular displacement of the reflected light signal into a linear displacement of the focused spot of light in the detector plane;

a photodetector for measuring position of radiant energy in the spot of light in the detector plane and producing a pair of electrical signals proportional to the linear displacement of the spot of light in the detector plane; and a signal processor including a programmed computer system to process the pair of electrical signal with the reference data to obtain a pair of values related to the deflection angle whereby the unknown radial and tangential tilt components of the disk are determined.

15. The system as claimed in claim 14 wherein the photodetector is a two-dimensional position sensing detector positioned in the detector plane.

16. The system as claimed in claim 15 wherein the two-dimensional position sensing detector is a photodiode.

17. The system as claimed in claim 14 wherein the beam of controlled light is a collimated light beam.

18. The system as claimed in claim 17 wherein the collimated light beam is a laser beam.

19. The system as claimed in claim 14 wherein the photodetector is a position sensing detector positioned in the detector plane.

20. The system as claimed in claim 19 wherein the position sensing detector is a single photodetector.

21. The system as claimed in claim 19 wherein the position sensing detector is a semiconductor device.

22. The system as claimed in claim 21 wherein the semiconductor device is a photodiode.

23. The system as claimed in claim 14 wherein the optical component is a focusing lens.

24. The system as claimed in claim 14 wherein the disk is a compact disk.

25. The system as claimed in claim 14 wherein the disk is an optical disk.

* * * * *